UNITED STATES PATENT OFFICE.

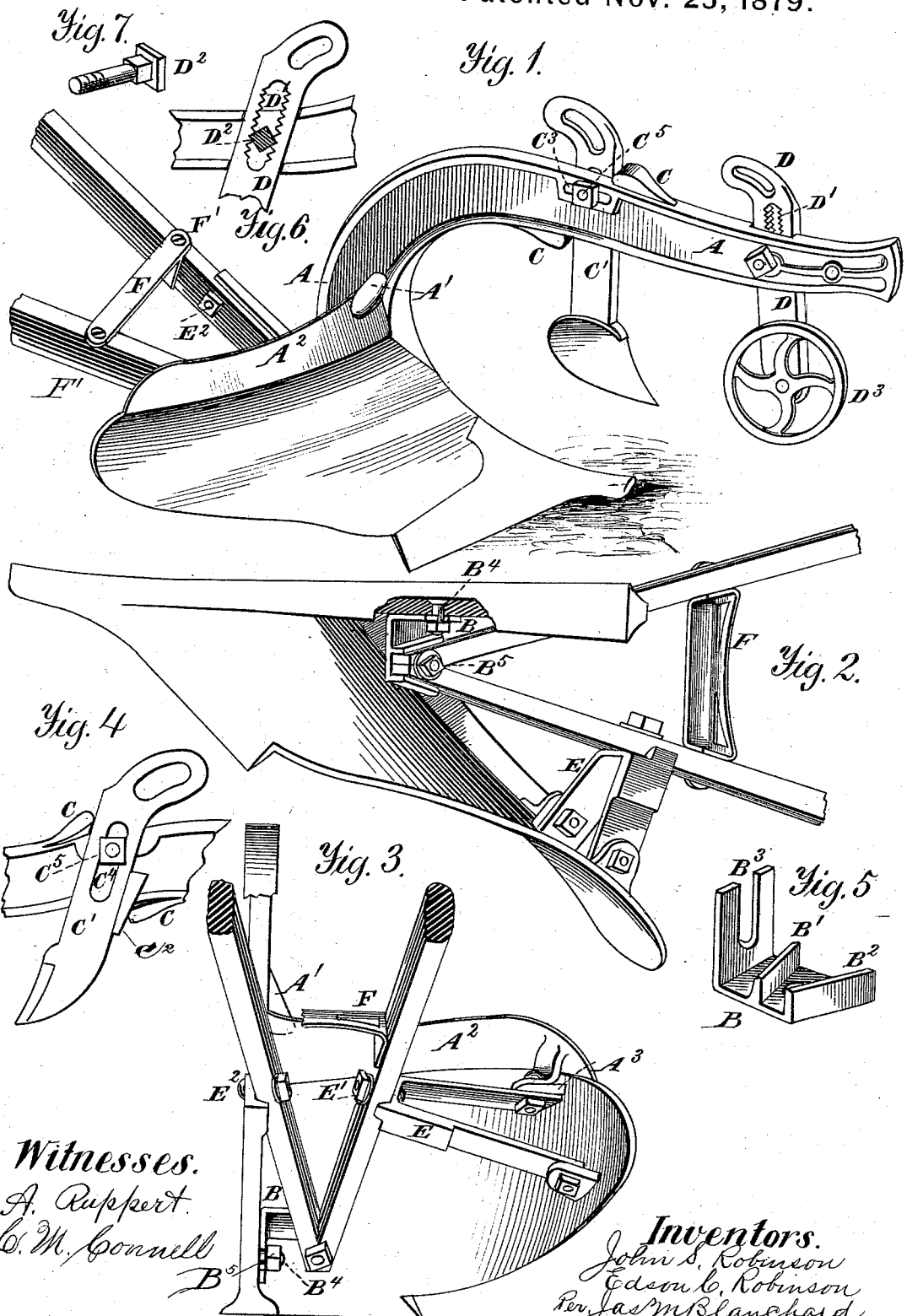

JOHN S. ROBINSON AND EDSON C. ROBINSON, OF CANANDAIGUA, NEW YORK.

IMPROVEMENT IN PLOWS.

Specification forming part of Letters Patent No. 221,975, dated November 25, 1879; application filed July 15, 1879.

*To all whom it may concern:*

Be it known that we, JOHN S. ROBINSON and EDSON C. ROBINSON, of Canandaigua, in the county of Ontario and State of New York, have invented certain new and useful Improvements in Plows; and we do hereby declare that the following is a full, clear, and exact description of the invention, which will enable others skilled in the art to which it appertains to make and use the same, reference being had to the accompanying drawings, and to letters of reference marked thereon, which form a part of this specification—

Figure 1 being an elevation of a plow having our improvements attached thereto, and showing the wheel for controlling the depth of the furrow and the jointer in position on the beam. Fig. 2 is a bottom view of the plow, showing the mold-board, the land-side, and the spreader for controlling the distance between the handles at the point where it is attached thereto. Fig. 3 is a rear-end view, showing a portion of the beam, the handles in position, the mold-board with a plate attached for the purpose of preventing earth or other substance from passing over the upper edge thereof into the furrows, the adjustable socket for receiving the beam ends of the handles, and a bracket for securing the handles to the mold-board. Fig. 4 is an elevation of the jointer and of a portion of the beam, showing one method of attaching the jointer thereto and of regulating its position thereon, lugs being shown upon the beam, and a wedge to be used in connection therewith. Fig. 5 is a perspective view of the adjustable socket for receiving the lower ends of the handles, it having a slot formed therein for the reception of a bolt for holding it and the handles in their adjusted position. Fig. 6 is an elevation of a portion of the wheel-standard and of the beam, showing the notched slot in the standard and the square portion of a bolt for holding it in its adjusted position on the beam; and Fig. 7 is a perspective view of a bolt for securing the wheel-standard to the beam.

Corresponding letters denote like parts in all of the figures.

This invention relates to plows for the cultivation of the soil; and it consists, first, in the method of attaching to the upper edge of the mold-board a plate of metal designed to prevent earth and other substances from passing over the same and falling into the furrow; secondly, in combining with the land-side of a plow an adjustable socket, whereby the outer ends of the handles may be elevated or depressed, for the purpose of adapting them to persons of different heights.

In constructing plows of this type we use any of the approved forms of mold-boards, shares, land-sides, and beams, the latter being, by preference, made of cast-iron.

For the purpose of attaching our improved device we form upon the beam A a lug, A', it being placed in about the position shown in Fig. 1 of the drawings, its office being to hold in position the front end of the plate $A^2$, which is placed upon the upper edge of the mold-board, as shown in Figs. 1 and 3, for the purpose of preventing earth or other substances from passing over such edge and falling into the furrow. The rear end of this plate, which may be of cast-iron or any other suitable metal, such as wrought-iron or steel, is secured to a lug, $A^3$, cast upon or attached to the mold-board near its outer end, it having a projection formed upon it for that purpose.

For attaching the lower ends of the handles to the beam or to the land-side of a plow there is provided an adjustable socket, B, (shown in detail in Fig. 5,) it being provided with flanges B' and $B^2$, which may be of the beveled form shown, for the purpose of receiving the beveled ends of the handles; or they may be equal distances apart throughout their entire length, and the handles be bent or otherwise formed so as to fit between them. In either case the socket is provided with a slotted arm, $B^3$, in order that it may embrace a bolt, $B^4$, by means of which and of a nut, $B^5$, its position on the beam or land-side may be adjusted, and by which it is held in position.

The object sought to be attained by making the socket B adjustable is the varying of the height of the outer ends of the handles of the plow, so that they may accommodate persons of greater or less height.

It will be seen that by loosening the nut $B^5$ and slackening the bolts which pass through the handles at a point higher up the socket may be moved up and down, and that a small amount of movement there will be sufficient to vary, to a considerable extent, the elevation and depression of the outer ends of said handles, and that thus the result above named will be accomplished.

The importance of attaching to the beam of a plow a jointer or sward-cutter is well known and generally acknowledged, and in attaching such devices it is important that provision should be made for adjusting their inclination as well as their height; and for the purpose of accomplishing this object in the most effective as well as the most economical manner, we attach to the beam of the plow, by casting thereon, lugs C C, one edge of which projects beyond the edge of said beam, and one of the lugs is arranged in front and the other in the rear of the standard C' of the jointer, so that it may receive support upon both of its sides, and thus be prevented from changing its inclination when it has once been properly adjusted in that respect. This adjustment may be effected by using a wedge, $C^2$, between one of the lugs and the standard.

For the purpose of facilitating the adjustment of the inclination of the jointer, as above described, there is a slot, $C^3$, formed in the beam, as shown in Fig. 1; and for the purpose of allowing of its vertical adjustment a slot, $C^4$, is formed in its standard, the bolt $C^5$, which passes through it and the beam of the plow, serving to hold it in both of its adjusted positions. When using the adjustable lug, or when the wedge is dispensed with, the slot in the beam may also be dispensed with, and a hole only for the passage of the bolt be substituted.

In order that the standard D, which carries the wheel $D^3$, may be properly adjusted and held in its position with the greatest amount of certainty and at the least expense, serrations or notches are formed upon the inner surfaces of a slot, D', formed therein, and a bolt, $D^2$, having a square section formed upon it, as shown in Figs. 6 and 7 of the drawings, is inserted therein, so that its corners fit into the serrations or notches in the slot, and thus prevent the wheel from being raised or lowered when in use.

For attaching the right-hand handle to the mold-board, there is cast upon said mold-board, or otherwise secured to it, suitable lugs, as shown in Fig. 3, to which there is bolted a bracket or brace, E, a bolt, E', passing through the same and through the handle, it being so arranged that when the outer ends of the handles are to be elevated or depressed this handle may turn slightly upon its bolt. At a point opposite the bolt E' a bolt, $E^2$, passes through the opposite handle and through the beam or land-side of the plow, upon which this handle turns in making the adjustment of its outer end.

For keeping the handles in position and regulating the distance between them at the point where it is placed, there is provided a spreader, F, which is, by preference, made of cast-iron, or of some other metal, it being provided with ears or flanges F', which rest upon the upper surfaces of the handles, and through which screws or bolts pass into each handle, that portion which is between said handles being of the form shown, or any other that will give the required strength with the least amount of metal, and at the same time prevent the handles from being forced toward each other. This spreader makes an iron, and consequently an unvarying, connection with the back end of the plow, and prevents the handles from being crushed together when in use. It also enables the manufacturers to make the handles of any number of plows alike, and yet cause them to fit plows which in casting shrink differently, and thus leave the points where the handles are attached a greater or less distance apart.

It will be observed that the handles may be easily removed when the plows are to be shipped, and kept at such times in their proper relations to each other, thus insuring their fitting the plows when connected therewith upon their arrival at their destination.

We are aware that it is not novel to use plates of sheet metal attached to the mold-boards of plows, as such a device is shown in the patent of G. Gehr of November 2, 1858. We do not, therefore, claim, broadly, such device or its combination with a plow, but limit our invention to the method of attaching it, substantially as set forth.

We are also aware that it is not novel to attach handles to plows at a single point by a socket, as such devices are shown in the patents of S. W. Pope of June 30, 1876, and A. Goodyear of March 11, 1879. We therefore disclaim the use, broadly, of such devices, and confine ourselves to the combination shown and claimed by us.

We are also aware of the patents to N. Burch of March 4, 1873, and of A. Goodyear of March 11, 1879, which show devices for holding the standard of the jointer in position. The devices there shown we do not claim, but limit our claim therefor to devices substantially such as those herein shown and described.

We are also aware of the patent to D. Dillenback of November 1, 1870, and the devices there shown we do not claim.

Having thus described our invention, what we claim, and desire to secure by Letters Patent, is—

1. In a plow, the combination of a mold-board having upon it a lug, $A^3$, a removable plate, $A^2$, for preventing earth and other substances from passing over the upper edge of said mold-board, and a lug, A', cast upon the beam A, for securing in place the forward end of the plate $A^2$, the parts being arranged to operate substantially as and for the purpose specified.

2. The adjustable socket B, provided with flanges B' and $B^2$, for forming a receptable for the lower ends of the handles, and a slotted arm, $B^3$, for adjusting its position, for the purpose of elevating or depressing the outer ends of said handles, in combination with the landside of a plow, substantially as set forth.

3. A plow having projections C C cast upon the upper and lower edges of its beam, which extend beyond the flanges thereof, whereby bearing-surfaces are formed upon the upper and lower flanges of the beam for the standard of the jointer to rest upon, substantially as and for the purpose set forth.

4. The combination of the beam A, having in it a slot or aperture, $C^3$, the lugs C C, the standard $C'$, and wedge $C^2$, the parts being arranged for operation substantially as set forth.

In testimony that we claim the foregoing as our own we affix our signatures in presence of two witnesses.

JOHN S. ROBINSON.
EDSON C. ROBINSON.

Witnesses:
S. G. METCALF,
HIRAM METCALF.